United States Patent [19]

Redmond

[11] 4,255,213
[45] Mar. 10, 1981

[54] METHOD FOR PRODUCING SOLAR COLLECTOR PLATES

[75] Inventor: James D. Redmond, Ann Arbor, Mich.

[73] Assignee: Amax Inc., Greenwich, Conn.

[21] Appl. No.: 899,115

[22] Filed: Apr. 24, 1978

[51] Int. Cl.³ .............................. C23F 7/04; F24J 3/02
[52] U.S. Cl. .................................... 148/6.11; 427/160;
126/417; 126/446; 126/901; 428/629
[58] Field of Search ............... 148/6.11; 126/901, 417, 126/446; 427/160

[56] References Cited

U.S. PATENT DOCUMENTS

| | | | |
|---|---|---|---|
| 1,937,629 | 12/1933 | Carveth | 148/6.11 |
| 2,537,035 | 1/1951 | Clingan | 148/6.11 |
| 2,542,994 | 2/1951 | Cobb | 148/6.11 |
| 2,618,578 | 11/1952 | Kreml | 148/6.11 |
| 3,963,530 | 6/1976 | Smollett et al. | 148/6.11 |
| 4,097,311 | 6/1978 | Ishibashi et al. | 148/6.21 |
| 4,133,914 | 1/1979 | Zani | 427/160 |
| 4,177,325 | 12/1979 | Roberts et al. | 126/417 |

FOREIGN PATENT DOCUMENTS 2803324  8/1978  Fed. Rep. of Germany ........... 126/901

*Primary Examiner*—Ralph S. Kendall
*Attorney, Agent, or Firm*—Michael A. Ciomek

[57] ABSTRACT

A solar collector plate made of stainless steel or a metal having a nickel-flash coating is immersed in a molten dichromate salt bath at a temperature between about 375° C. and about 500° C. sufficiently long to provide a selective oxide coating which has a Figure of Merit of at least about 4. The oxide coating is continuous, has a microscopically nodular texture with the average nodule size being at least about 5000 Å and displays a Figure of Merit of at least about 4.

7 Claims, 4 Drawing Figures

METHOD FOR PRODUCING SOLAR COLLECTOR PLATES

FIELD OF THE INVENTION

The present invention relates to solar collection and more particularly a method for producing a selective coating on a planar solar collector surface and the surface produced thereby.

BACKGROUND OF THE INVENTION

Solar collectors are typically "black" metal surfaces that absorb sunlight and are covered by glass to minimize heat losses. Sunlight is transmitted through the glass and is absorbed by the "black" surface. The "black" surface absorbs the shorter wavelength and emits longer wavelength energy which is absorbed by the glass thereby creating a greenhouse effect which increases the overall efficiency of the collector. A heat transfer fluid is circulated through the collector to collect the absorbed heat and transfer it to a remote location where it is utilized for space heating or the like.

The "black" surface is actually a selective coating which selectively absorbs the visible radiation and emits only a small portion of the generated infrared radiation. Although some of such coatings are truly black in appearance, many are black only in the sense of their ability to absorb visible light while emitting only small amounts of infrared radiation and may have the physical appearance of being transparent. The effectiveness of a selective coating is measured by the Figure of Merit which is the ratio of its absorptivity to its emissivity.

Numerous selective coatings have been developed. For example, selective paints have been developed. Although such painted surfaces work reasonably well, they often are not durable when exposed to the elements and to the high temperatures generated by the absorption process. Electrolytically produced oxide coatings on stainless steels have high Figures of Merit and overcome the drawbacks of painted surfaces but are presently very expensive.

Stainless steel, which are often used as solar collector plates, have been chemically blackened by immersion in molten dichromate salt baths. Chemical methods of blackening stainless steels are disclosed in U.S. Pat. Nos. 2,394,899; 2,499,764; 2,513,302; 2,537,035; 2,618,578; 3,437,532; 3,556,871; 3,900,601; and 3,963,530. The object of blackening in all but one of these patents is to provide a visually black surface for decorative or architectural purposes. U.S Pat. No. 3,900,601 discloses a wet process for treating metallized glass to provide a coating which rejects solar energy and is highly efficient in reflecting infrared radiation. None of these patent teaches that stainless steels and nickel-flash coated surfaces can be chemically treated to produce oxide coatings that are selective in the absorption of solar energy.

It has now been found that collector surfaces made of stainless steel or flashed coated with metallic nickel can be chemically oxidized under carefully controlled conditions to provide an oxide coating which selectively absorbs visible light and emits only small amounts of infrared radiation.

DESCRIPTION OF THE DRAWINGS

FIG. 4 is a pictorial flowsheet of the process.

SUMMARY OF THE INVENTION

Generally speaking, the present invention relates to planar solar collectors and, more specifically, to a method for applying a selective oxide coating to solar collectors made of stainless steel or having nickel flash coated collector surfaces. Fabricated stainless steel collector plates or collector plates flash coated with nickel are immersed in a molten bath of at least one dichromate salt selected from the group consisting of sodium and potassium long enough to provide the collector plate with an oxide coating having a Figure of Merit between about 4 and about 13.

DETAILED DESCRIPTION

Figure 1:
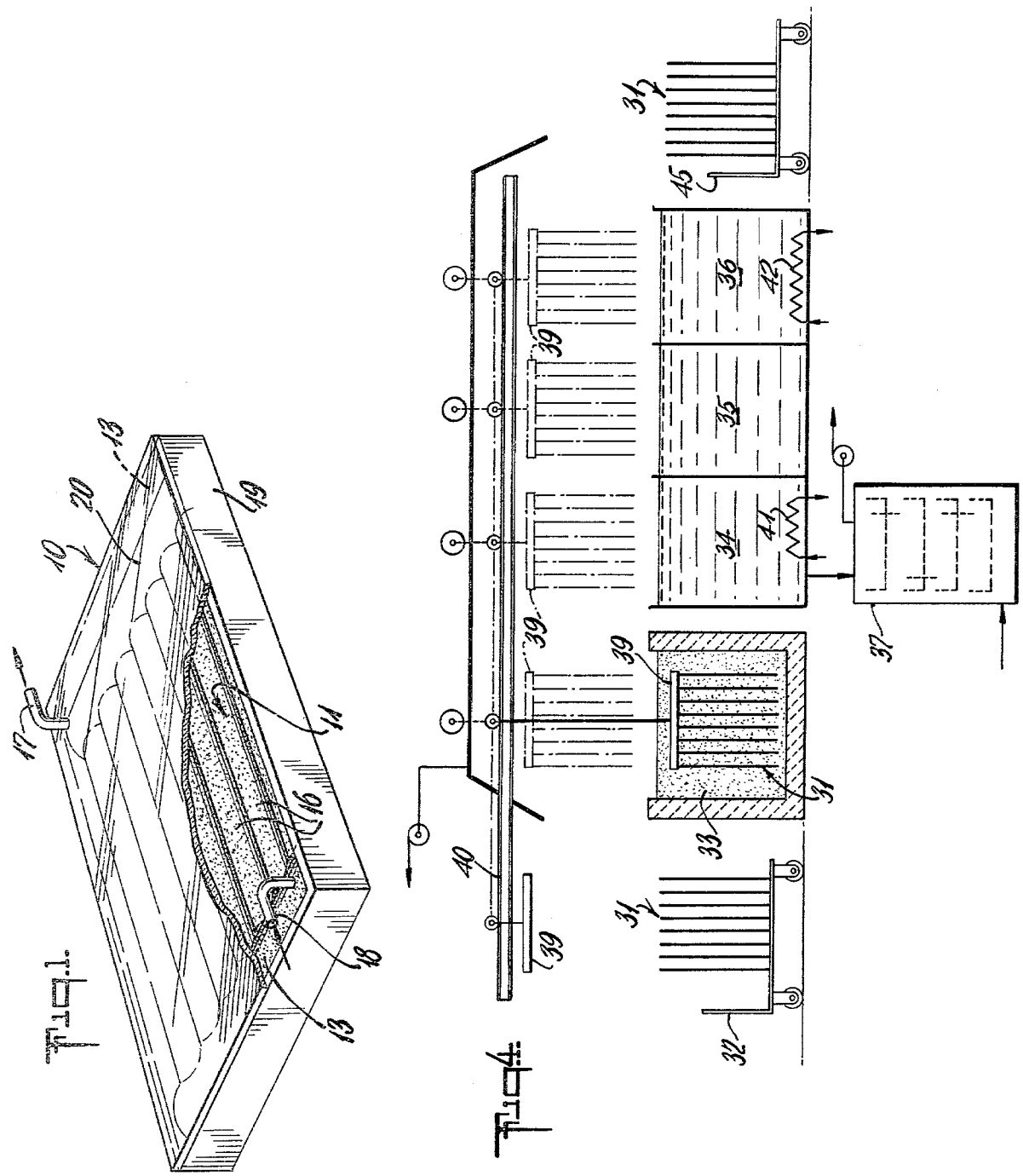
FIG. 1 is a pictorial representation of a solar collector unit.

Referring to FIG. 1, a planar solar collector is shown, generally at 10. Solar collector 10 comprises collector plate 11 which is two metallic sheets 12 (only the top sheet being visible in the drawing).

Collector plate 11 is made by welding sheets 12 along the edges. Diametric corners of one of the metallic sheets 12 are provided with inlet and outlet ports 17 and 18, respectively. One of these ports is plugged and the plate is placed in a die. High pressure gas is introduced into the other part to inflate plate 11 into a pillowlike form having headers 13 and manifold passages 16. The inflated plate is then treated to give its surfaces a selective coating. Alternatively, the metallic sheets can be first stamped or embossed to form headers 13 and manifold passages 16, and two of the thus formed sheets are then welded together to form collector plate 11.

For installation, inflated plate 11 with its selective coating is placed in collector box 19 which is provided with thermal insulation at its bottom to minimize heat losses. Box 19 is provided with glass cover 20 (shown as being partially broken away) which protects plate 11 and its selective coating and increases the efficiency of the collector units by transmitting visible light from the sunlight to the selective coating and trapping infrared light emitted from the coating.

Collector plate 11 can be made of any metal which provides good thermal conductivity. If the plate is made of any metal other than a stainless steel, it is given a flash coating of metallic nickel or metallic chromium by well known techniques. It is preferred, however, to make the collector plate out of ferrous base alloys containing sufficient chromium to impart superior corrosion resistance. Ferritic, austinitic or martensitic stainless steel can be used. The choice of any particular stainless steel will be dictated by a variety of factors including cost, formability, weldability and corrosion resistance. Examples of stainless steels that can be used include the well-known AISI types 304 and 304L, 18–20 Cr, 8–10.5Ni; AISI type 316, 16–18 Cr, 10–14Ni, 2–3Mo; AISI type 409 10.5–11Cr; 18Cr-Ti (ASTM XM-8); 18 Cr-2Mo (UNS-S44400). A stainless steel that has been found to be particularly advantageous is 18Cr-2Mo (UNS-S44400).

Whatever stainless steel is used it has been found that standard 2B mill surfaces produce oxide coatings that are more selective than are surfaces dulled by vapor blasting or pickling. Dulled surfaces appear to increase the emissivity by at least twofold thereby lowering the Figure of Merit by a factor of at least 2.

The selective coating, whether it be on stainless steel or a nickel-flash coating, is established by immersing the inflated collector plate in a molten bath of at least one dichromate salt of at least one metal selected from the group consisting of sodium and potassium. The plate is immersed in the bath for a sufficient time to provide an oxide coating that has a Figure of Merit of between about 4 and about 13.

The molten bath of the dichromate salt can be a single salt or a combination of the sodium and potassium salts to provide a lower melting eutectic composition. Sodium chromate, however, melts at a sufficiently low temperature that little advantage is gained by resorting to the use of eutectic compositions. Moreover, the use of higher temperatures is preferred because the rate of oxidation is enhanced at such higher temperatures. Temperatures as high as just below the decomposition of the dichromate salt and as low as the melting point of the salt can be employed. However, it is advantageous to maintain the molten bath at a temperature between about 375° C. and about 500° C., advantageously between about 415° C. and about 435° C., to maximize the rate of oxidation while minimizing the risk of decomposing the dichromate salt.

Immersion times in the molten dichromate bath will vary depending upon the composition of metal being oxidized. The immersion time is a critical factor of the process in accordance with the present invention. Upon immersion in the molten salt the selectivity of the plate surface increases to a maximum and then starts to decrease.

Immersion time should be long enough to provide a continuous oxide coating but not so long as to destroy the selectivity of the coating. Immersion times are directly related to the temperature of the molten bath. In most instances, immersion times between about 1 minute and about 15 minutes, advantageously between about 1 minute and about 5 minutes, are sufficient to insure a continuous oxide coating having a high degree of selectivity. In the foregoing range, the shorter times are applicable when bath temperatures of about 435° C. are employed while the longer times are for lower bath temperatures. Specifically, at bath temperatures between about 415° C. and about 435° C. immersion times will generally range between about 1 minute and about 5 minutes. The immersion times and temperatures may vary for different materials and it is recommended that initial tests be conducted to ascertain the immersion times that provide the highest Figures of Merit.

Figure 2:
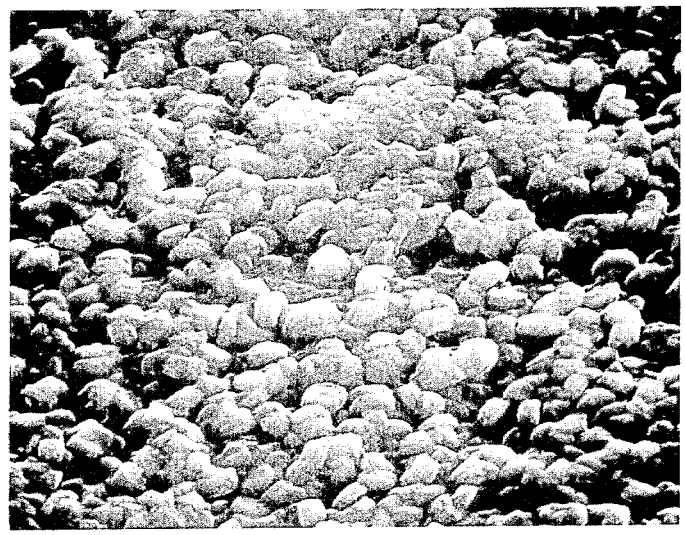
FIGS. 2 and 3 are photomicrographs at a magnification of 10,000 times of the oxide coating produced by the process in accordance with the present invention and by the prior art electrolytic techniques respectively.
Figure 3:
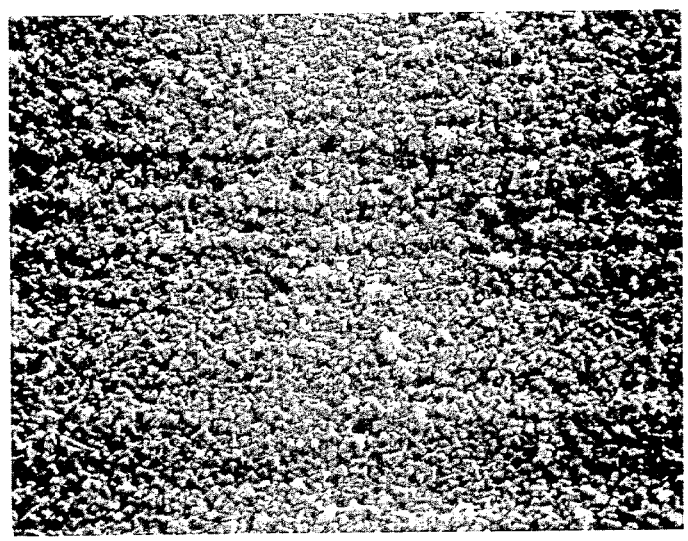

Immersion of the stainless steel or nickel-flashed coated collector plates in the molten dichromate bath produces a microscopically nodular oxide coating as shown in FIG. 2 which is a photomicrograph at a magnification of 10,000 times. The individual nodules have an average particle size of at least about 3,000 Angstroms (Å), and most frequently an average particle size of at least about 5000 Å. Oxide coatings produced by known electrolytic techniques have the same nodular texture but have, as is shown in FIG. 3 which is also a photomicrograph at a magnification of 10,000 times, an average particle size of less than about 2000 Å.

The selective coatings produced by the process in accordance with the present invention have high Figures of Merit. The selective coatings have a minimum Figure of Merit of at least about 4. In most instances the Figure of Merit of these coatings range between about 4 and about 10, advantageously between about 4 and about 13. Not only do the selective coatings have high Figures of Merit but the coatings are abrasive resistant and can withstand the high temperatures generated in use, even when flow of the heat exchange medium is terminated due to pumping equipment failures.

FIG. 4 is a flowsheet showing the operational steps that would be employed in carrying the process in accordance with the present invention into practice on a commercial scale. Fabricated solar collector plates 31 are transferred to the selective coating station on dolly 32. The selective coating station comprises electrically heated salt pot 33, lowered by hoist 39 which runs on monorail 40, into the molten salt, held in the salt bath for 1 to 5 minutes, lifted from the salt pot and thus sequentially conveyed to wash tanks 34, 35 and 36 for washing by immersion. The washed collector plates are placed on dolly 45 for removal to the next operation. Wash water in wash tank 34 containing about 6% sodium dichromate is sent to crystallizer 37 to recover crystals of sodium dichromate which can be recycled to salt pot 33. Wash tank 34 is provided with cooling coils 41 and wash tank 36 is provided with heating coils 42. Exhaust hood 43 is provided over salt pot 33 and wash tanks 34, 35 and 36.

In order to give those skilled in the art a better understanding of the present invention, the following illustrative examples are given:

EXAMPLE I

This Example demonstrates the importance of starting surface finishes and the length of time the plate is immersed in the dichromate bath.

Two sets of specimens of an 18Cr-2Mo stainless steel, one set having a standard 2B mill finish and the other set having a surface dulled by vapor blasting, were immersed in a molten sodium dichromate bath held at a temperature between about 415° C. and 430° C. for varying lengths of time. After being withdrawn from the molten salt bath, the specimens were washed, dried and sent out for determination of the absorptivities and emissivities.

The absorptivities of all the specimens were about 0.70±0.15 for all surfaces and coating thicknesses. The uncertainty of the absorptivity can be attributed to the less than optimum size of the specimens. The emissivity increased with the length of the immersion time (i.e. the emissivity increases with increasing oxide thicknesses) and with dulled surfaces. The emissivity changes are shown in Table I.

TABLE I

| TIME IN BATH | EMISSIVITY | |
|---|---|---|
| Minutes | 2b Finish | Dulled Finish |
| 1 | 0.11 | 0.30 |
| 2 | 0.15 | 0.32 |
| 5 | 0.17 | 0.35 |
| 15 | 0.20 | 0.40 |

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In a method for producing a solar collector which comprises a collector box; a collector plate through which a heat exchange fluid circulates for transferring heat from said heat plate to a remote location, said plate being placed in said collector box and having a collector surface of stainless steel or another metal flash coated with nickel or chromium which surface is provided with an oxide layer to provide a selective coating and a glass cover for enclosing said plate, the improvement which comprises immersing the collector plate in a molten bath of a dichromate salt of at least one metal selected from the group consisting of sodium and potassium for a time sufficient to provide the collector surface with an oxide coating having a Figure of Merit of between about 4 and about 13.

2. The method as described in claim 1 wherein said molten bath is sodium dichromate.

3. The method as described in claim 2 wherein the molten bath is maintained at a temperature between about 375° C. and about 500° C.

4. The method as described in claim 3 wherein the molten bath is maintained at a temperature between about 415° C. and about 435° C.

5. The method as described in claim 3 wherein the collector plate is immersed in the molten bath for between about 1 minute and about 15 minutes.

6. The method as described in claim 5 wherein the collector plate is immersed in the molten bath for between about 1 minute and about 5 minutes.

7. The method as described in claim 6 wherein the collector plate has a surface finish at least equivilent to a standard 2B mill finish.

* * * * *